July 7, 1970 M. J. CONNOR 3,518,866
FEED OR DISCHARGE MECHANISM FOR A FORMING PRESS
Filed Dec. 12, 1967 8 Sheets-Sheet 2

INVENTOR.
MARK J. CONNOR
BY
Meyer, Tilberry & Body
ATTORNEYS

July 7, 1970          M. J. CONNOR          3,518,866

FEED OR DISCHARGE MECHANISM FOR A FORMING PRESS

Filed Dec. 12, 1967          8 Sheets-Sheet 4

INVENTOR.
MARK J. CONNOR

BY
Meyer, Tilberry & Body

ATTORNEYS

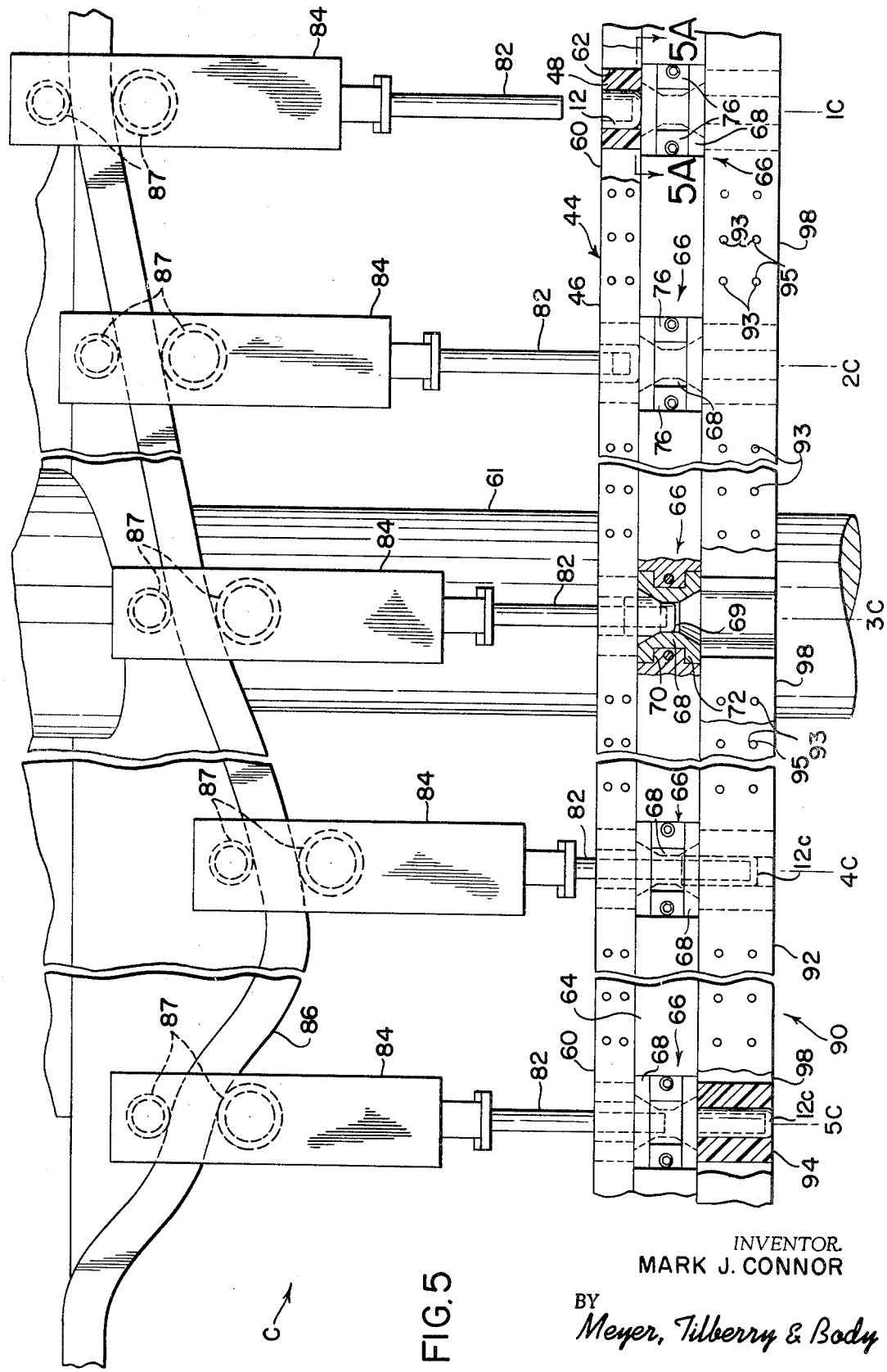

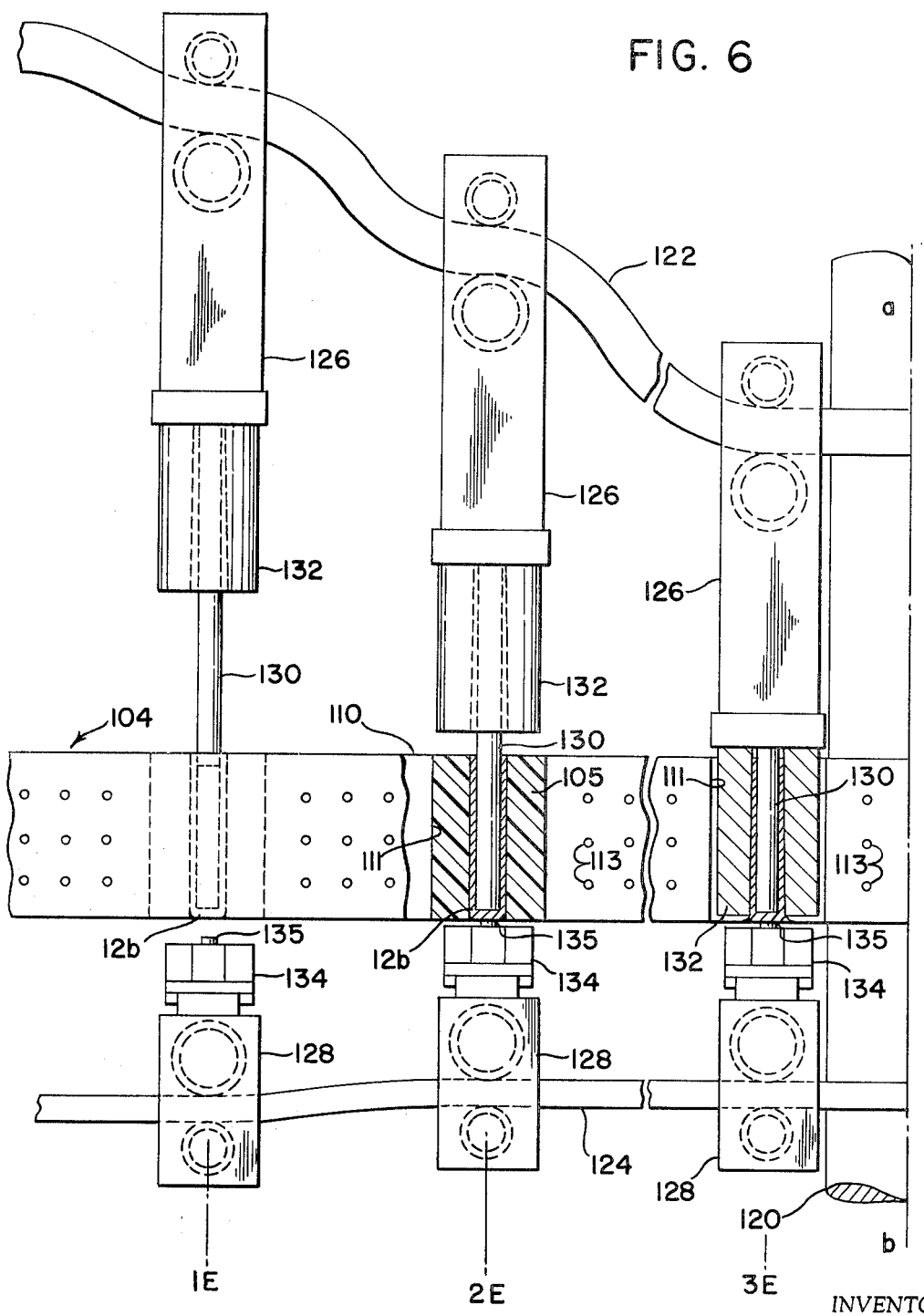

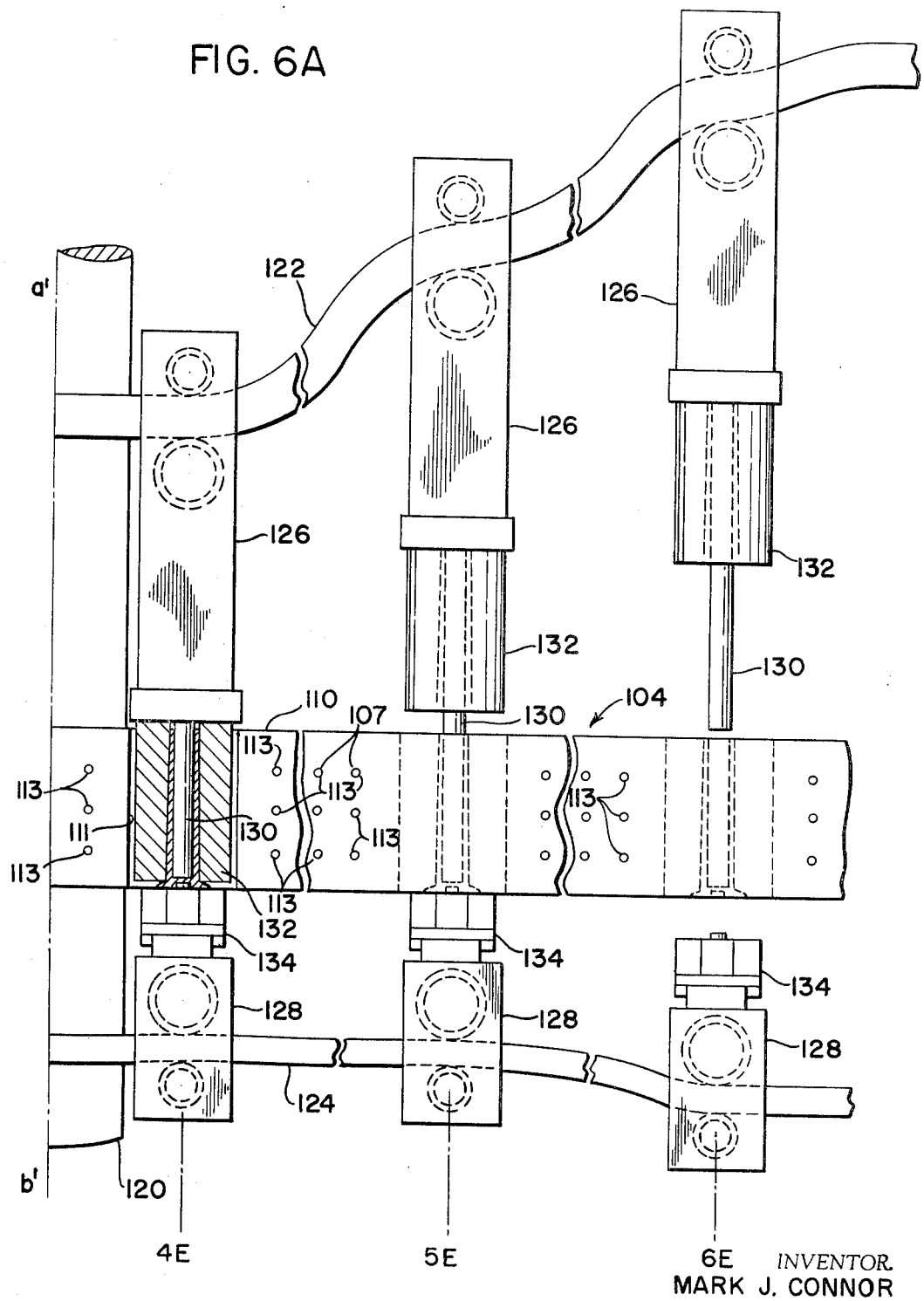

United States Patent Office 3,518,866
Patented July 7, 1970

3,518,866
FEED OR DISCHARGE MECHANISM FOR A
FORMING PRESS
Mark Joseph Connor, Wilmington, Del., assignor to E. W. Bliss Company, Canton, Ohio, a corporation of Delaware
Filed Dec. 12, 1967, Ser. No. 689,935
Int. Cl. B21d 43/02
U.S. Cl. 72—361          11 Claims

ABSTRACT OF THE DISCLOSURE

The specification discloses an improved feed or discharge mechanism for a forming press of the type including a die and a ram which cooperate to form a workpiece positioned therebetween. The mechanism includes an endless flexible belt carrying spaced workpiece carrying or receiving openings. Guide means are provided to guide the belt adjacent the die and sequentially align the openings with the die and ram to engage a formed workpiece or deposit a workpiece to be formed depending on whether the mechanism is functioning as a feed or a discharge means.

The present invention is directed toward the press art and, more particularly, to a feed or discharge mechanism for presses of the type including aligned dies and rams.

The invention is especially suited for use in combination with rotary turret type presses and will be described with particular reference to such use in a cartridge casing processing line; however, it will be appreciated the invention is capable of broader application and could be used with other types of presses and in the manufacture of other types of products.

In the past, ammunition cartridge cases have been manufactured by batch processing techniques using conventional drawing and forming presses. Normally, the process has begun with relatively short, heavy walled, cup-shaped blanks which are drawn and redrawn in conventional presses until the blank has been elongated to beyond the required length and the wall reduced to the desired thickness. Thereafter, the blank, now a tube having a closed end, was trimmed to the required length, headed, lathe turned and, finally, tapered, and the opening formed for the primer. In addition to the above steps, intermediate annealing, pickling, and washing and drying steps were carried out.

Because of the many diverse operations performed, and the lack of suitable automatic feed and discharge mechanisms, the casings were formed by batch processing techniques at comparatively slow rates. That is, the output of each of the machines performing the individual steps was collected in a hopper and then delivered to the next machine where they were transferred to conventional reciprocatory feed mechanisms. As a consequence, a large amount of floor space was utilized and a great deal of manual handling of the parts was required.

The present invention provides a unique continuous belt-type feed and/or discharge mechanism which allows a great many of the above-noted forming steps to be performed in one continuous operation at a high rate of parts per minute without manual handling or batch processing.

In accordance with one aspect of the invention apparatus is provided including: a die; a ram aligned with said die and reciprocable between a first position spaced from said die to a second position wherein it cooperates with said die to form a workpiece positioned therebetween; feed means supplying workpieces between said ram and said die when said ram is in first position, said feed means including: a first endless flexible belt member carrying spaced workpiece receiving openings, means for positioning workpieces in said openings, and guide means for guiding said belt member between said ram and said die and aligning one of said openings with a workpiece therein with said ram and maintaining said one opening aligned therewith at least until said ram engages said workpiece.

In accordance with another aspect of the invention apparatus is provided including: a die; a ram aligned with said die and reciprocable between a first position spaced from said die to a second position wherein it cooperates with said die to form a workpiece positioned therebetween; feed means for feeding workpieces between said ram and said die when said ram is in said first position; and, discharge means for removing a formed workpiece after said ram has disengaged said workpiece, said discharge means including: a first endless flexible belt carrying spaced workpiece receiving openings and guide means for guiding said belt adjacent said die and positioning one of said openings in alignment with said ram at least during the period said ram is in said second position.

By the provision of the endless flexible belt feed and discharge mechanisms several forming presses can be interconnected in a single, continuous processing line and the workpieces continuously formed with no batch processing, manual handling, etc. When the presses are of the rotary turret type the flexible belt arrangement is especially advantageous since feed and discharge takes place in one smooth motion and extremely high production rates are possible.

Accordingly, a primary object of the present invention is the provision of a press provided with an improved automatic feed and/or discharge mechanism.

Another object is the provision of a press and associated feed mechanism which is especially suited for high speed mass production of parts of the nature of cartridge casings.

A further object of the invention is the provision of a feed and/or discharge mechanism which is especially suited for use with rotary turret type forming presses.

Yet another object of the invention is the provision of a press with a feed and discharge mechanism wherein the workpieces are always firmly gripped and under control.

A still further object is the provision of a forming press having feed and discharge means wherein the workpiece is automatically transferred from the feed means to the discharge means by the press's forming ram.

Still another object is the provision of a press having a discharge mechanism which is arranged to function as the feed mechanism for a subsequent press.

These and other objects and advantages will become apparent from the following description when read in conjunction with the accompanying drawings wherein:

FIG. 5 is a view, partially in section, taken on line 5—5 of FIG. 1;

FIGS. 6 and 6A are elevational views, partially in section, taken on line 6—6 of FIG. 1; and, FIG. 7 is an enlarged sectional view through one of the ram assemblies shown in FIG. 6.

Figure 1:
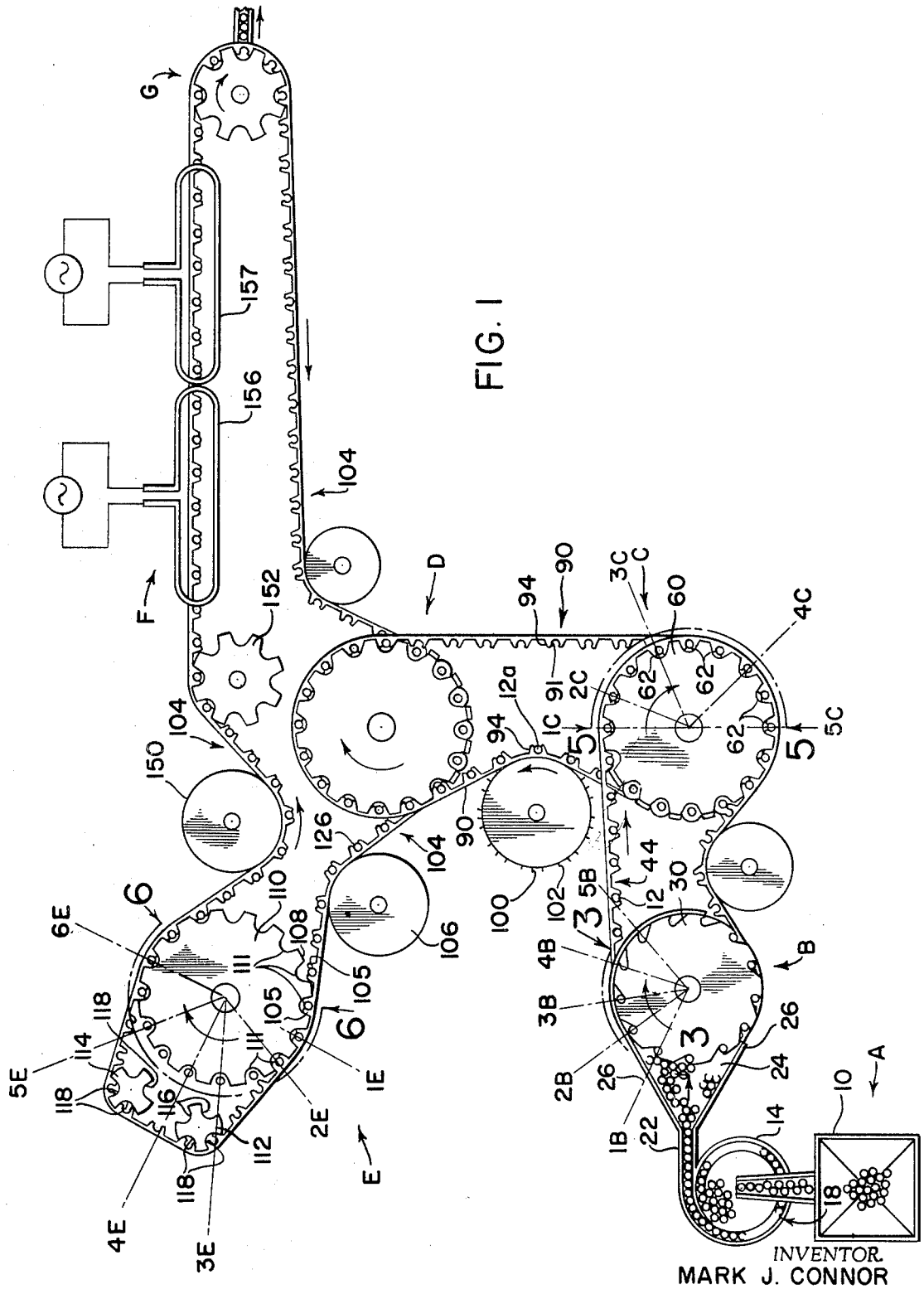
FIG. 1 is a plan view, somewhat diagrammatic, of a portion cartridge casing processing line utilizing preferred embodiments of the present invention.

Referring now to the drawings wherein the showings are for the purpose of illustrating preferred embodiments of the invention only, FIG. 1 shows, somewhat diagrammatically, a cartridge casing processing line incorporating preferred embodiments of the invention. The layout of the processing line, or the specific forming or treating steps performed therein, form no part of the subject invention but are illustrated merely for the purpose of aiding in a proper appreciation and understanding of the invention.

THE PROCESSING LINE IN GENERAL

Although the specific construction of various components of the processing line will subsequently be described in detail, broadly, as shown, the line includes a blank feed apparatus A which feeds relatively short, heavy walled cup-shaped blanks to a rotary inserting apparatus B which inserts the blanks into resilient openings carried on an endless flexible belt. The belt is trained about a first guide member carried on the inserting apparatus B and a second guide member mounted on a rotary turret type forming press C. The press C could be of a variety of types but is preferably of the general type shown in the commonly assigned copending application Ser. No. 575,387, filed Aug. 26, 1966. As the blanks are conveyed about the turret press C they are acted upon by rams carried by the press and, moved through a drawing or extruding ring to elongate and thin their side walls. Simultaneously, the blanks are removed from the openings in the first belt and received in similarly arranged openings carried on a second subjacent belt. The second belt functions to discharge the partially formed blanks from press C and convey them to a second generally similarly arranged rotary turret type forming press D which redraws or performs other forming operations on the blanks.

Simultaneous with the forming operations, press D transfers the blanks from the second belt to a third belt which conveys the blanks to a third rotary turret type forming machine E. Machine E is arranged to "head" and taper the blanks in a manner required for cartridge casings. While passing through the forming machine A the blanks are separated from the belt and, subsequently, reinserted in the belt openings and discharged from the machine. Thereafter, the belt is guided through a conventional induction type annealing apparatus F which, during passage of the belt therethrough, anneals the casings. Subsequently, the belt passes through an apparatus G which discharges the casings from the belt where they can be collected for subsequent machining or other processing.

BLANK FEED APPARATUS A

Figure 2:
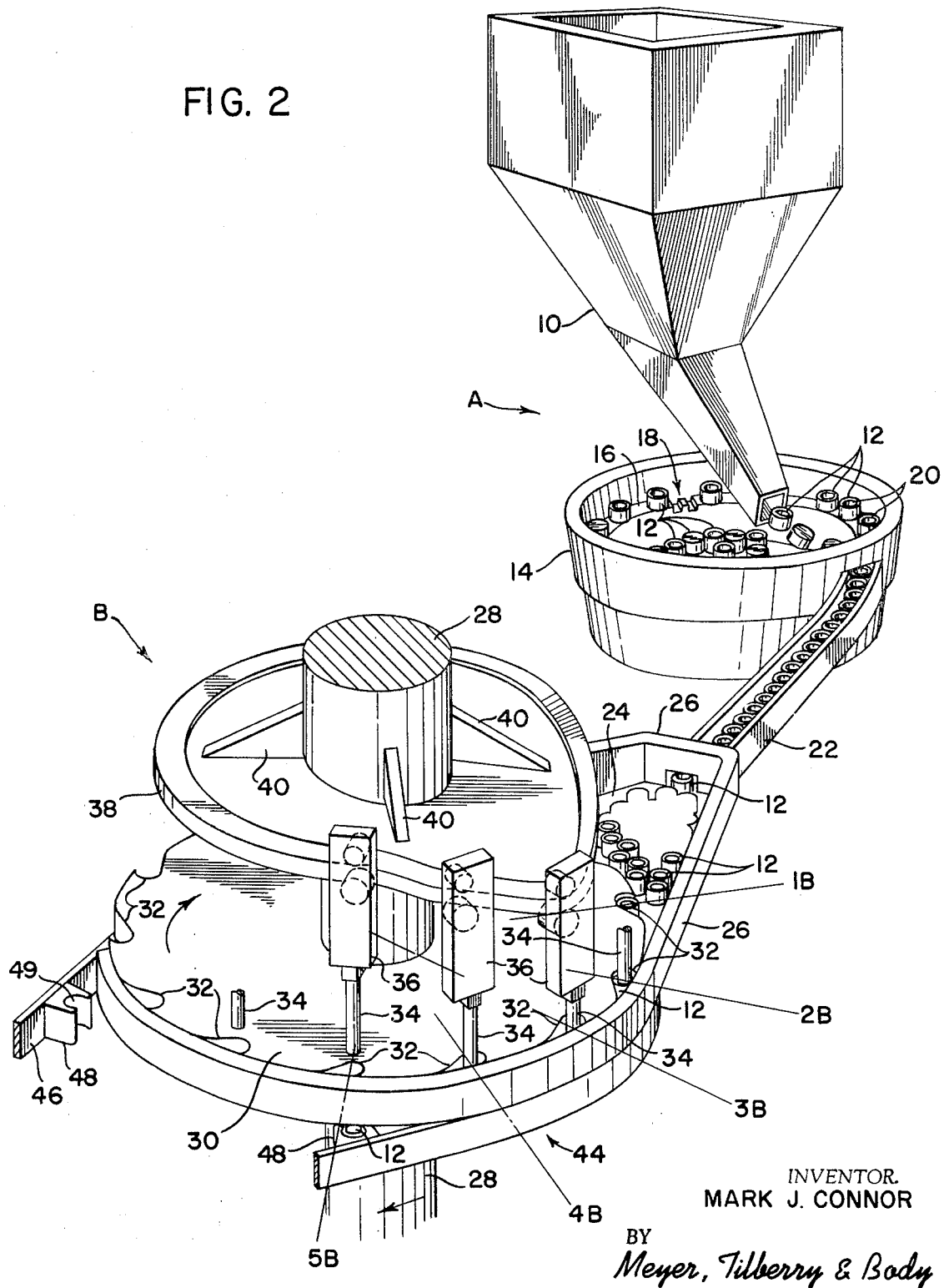
FIG. 2 is a pictorial view of the workpiece supplying portion of the processing line of FIG. 1.

As best shown in FIG. 2, the blank feed apparatus A comprises a conventional vibratory batch feeder 10 which discharges the short, heavy walled, cup-shaped blanks 12 to a conventional vibratory bowl feeder 14. Bowl feeder 14 includes a spiral trackway 16 which is given relatively high frequency, low amplitude vibrations to cause the blanks 12 to travel up and around the spiral. During their travel along trackway 16 the blanks are assured of having proper orientation by an orienting means 18. Means 18 are conventional and assure that blanks 12 leave the trackway 16 with their open ends 20 facing upwardly. The blanks continue along track 16 and are discharged from the vibratory bowl feeder 14 along a guide track 22. The apparatus thus far described is a conventional, commercially available type feed apparatus and, accordingly, further description appears unnecessary.

INSERTING APPARATUS B

As the blanks discharge from guide track 22 they pass into an inserting apparatus B. As shown, inserting apparatus B includes a vibratory pan 24 which receives the blanks 12 coming from guideway 22. A vertically extending wall, or keeper rail 26 extends about pan 24 to maintain the blanks thereon. Positioned adjacent pan 24 and mounted for rotation on a non-rotating, vertically extending support shaft 28 is a rotary feed table member 30. The feed table 30 is continuously driven in a clockwise direction by drive apparatus not shown. As can be seen, the outer periphery of the feed table 30 is provided with circumferentially spaced inwardly extending blank receiving recesses 32. Accordingly, as the table 30 is rotated the blanks 12 in the vibratory pan 24 are received in the recesses 32 and rotated clockwise in the manner shown.

Positioned above the feed table 30 and axially aligned with each of the respective blank receiving openings 32 are a plurality of punch or ram members 34 carried on slides 36. Although only three punch members are shown, it should be appreciated that one such punch is provided for each of the recesses 32. The slide members 36 which support the punches 34 are mounted in a turret member, not shown, which is driven simultaneously with the feed table 30. The turret member restrains the punches against radial movement, but permits them to have guided vertical movement relative to the recesses 32. The details of construction of a turret member of this type are conventional and are shown in the aforementioned commonly assigned patent application.

The means for selectively driving the slides to cause the rams to be reciprocated vertically comprise a stationary drum-type cam member 38 which is fixedly supported from shaft 28 by legs 40. Consequently, as the table 30 and the turret are rotated, the rams 34 are reciprocated vertically throughout a path determined by the layout of cam member 38.

Figure 3:
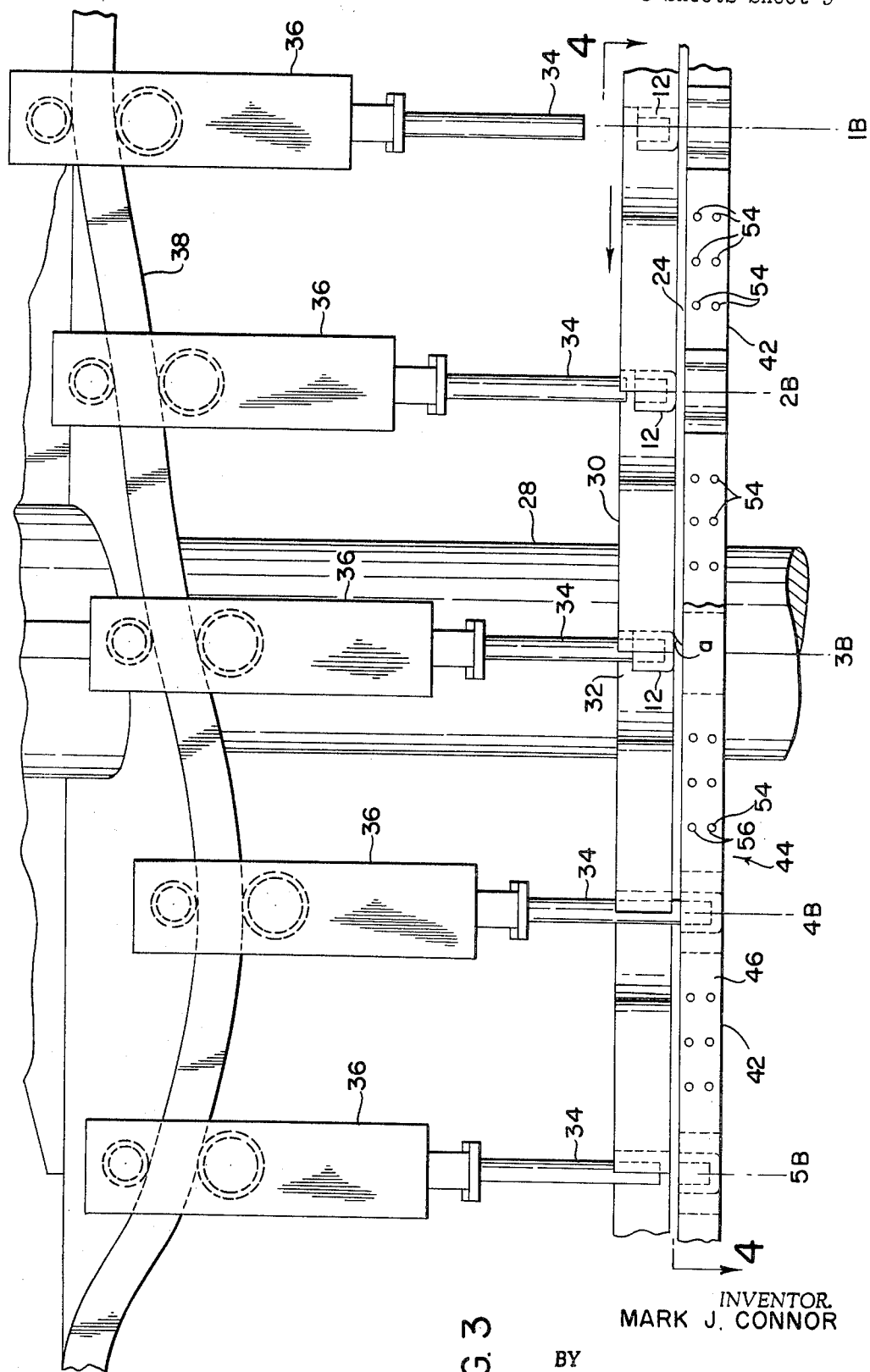
FIG. 3 is a sectional elevational view taken on line 3—3 of FIG. 1.
Figure 4:
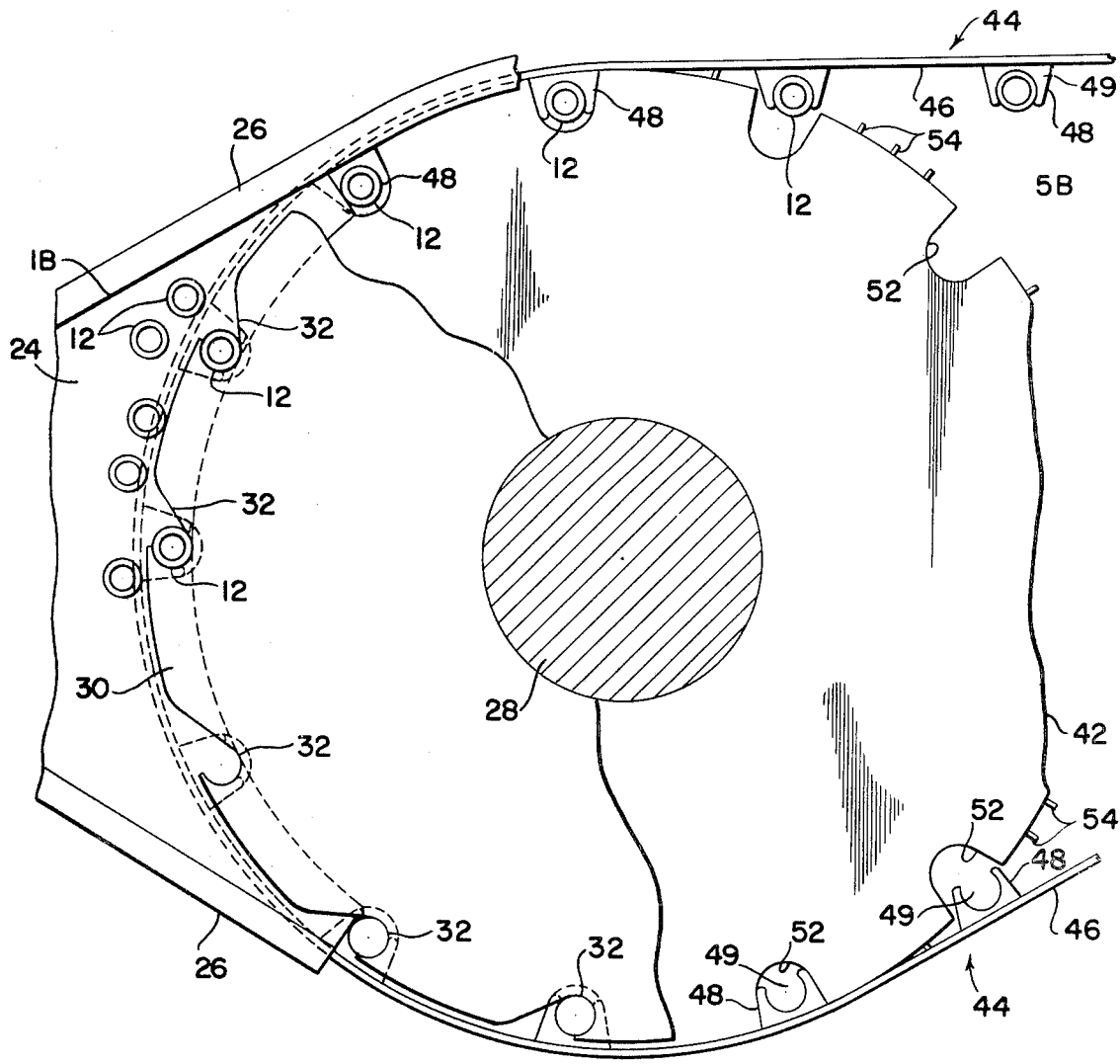
FIG. 4 is a cross-sectional view taken on line 4—4 of FIG. 3.

Referring specifically to FIGS. 3 and 4, it is seen that positioned immediately below rotary table 30 and connected thereto for simultaneously rotating therewith is a belt guide member 42. Member 42 is arranged to simultaneously drive and guide a belt member 44 about its outer periphery.

Although belt member 44 could be of a variety of specific configurations and constructions, it is shown as including an elongated, continuous, relatively flexible band of stainless steel 46. Carried on band 46, and extending laterally therefrom, are a plurality of spaced, resilient, plastic clip members 48 formed, for example, from an acrylonitrile-butadiene-styrene resin. As shown, each member 48 has a vertically extending opening 49 formed therein. Openings 49 are sized so as to be capable of closely gripping and holding the circumferential surface of blanks 12. The clip members 48 are fixedly connected to the band 46 in any convenient manner, such as through the use of rivets or adhesive bonding.

Referring again to FIG. 4 and the belt guide member 42, it is seen that the outer periphery of the member 42 is provided with inwardly extending recesses or openings 52 which are arranged to receive the clip members 48. Accordingly, the belt 44 is driven in the manner of a chain by engagement of the clip members in the recesses 52. Additionally, the belt is further guided and driven by small pins 54 which extend radially outward from the outer surface of member 42 and engage small openings 56 formed transversely of band 46 (see FIG. 3).

As will be appreciated, member 42 is provided with a number of recesses 52 equal to, and identically spaced with, the recesses 32 of rotary table member 30. Additionally, recesses 52 are arranged so that when the clip members 48 are in the recesses, the opening 49 of the respective clip member is aligned with the blank 12 carried in the corresponding recess 32 of the table 30.

The importance of this relationship can be best seen by reference to FIG. 3. As shown, when any particular recess 32 is at the position labeled 1B, the punch 34 is spaced above table 32 and the blank 12 is supported on a portion of table 24 which extends inwardly between member 30 and member 42 to the position noted by reference letter a. As the table and rams are rotated in a clockwise direction (to the left as shown in FIG. 3) the layout cam 38 is arranged to cause the rams 34 to move downwardly as shown in positions 2B and 3B. When the ram has reached position 3B it enters the open upper end 20 of the blank 12 and, upon further movement downwardly, forces the blank into the opening 49 in the subjacent resilient clip 48. As the table and ram move from position 4B to position 5B, the ram is withdrawn from the blank and the blank is then firmly gripped in the belt and can be conveyed away in the manner shown in FIG. 2.

It is important to note that should any of the blanks be improperly oriented, i.e. have their open end 20 facing down, they will be forced completely through the belt during the downward movement of the ram. As will hereafter become apparent, this prevents blanks from being misfed to the press C.

ROTARY PRESS C

Referring again to FIG. 1, it is seen that as the belt 44 leaves the inserting apparatus B it is trained about a guide disc or member 60 rotatably carried by the main stationary support shaft 61 of the rotary press C. Member 60 is constructed in the same manner as previously described for member 42 of the inserting apparatus B, that is, it is provided with inwardly extending recesses 62 which receive the clip members 48 of the belt 44.

Figure 5A:
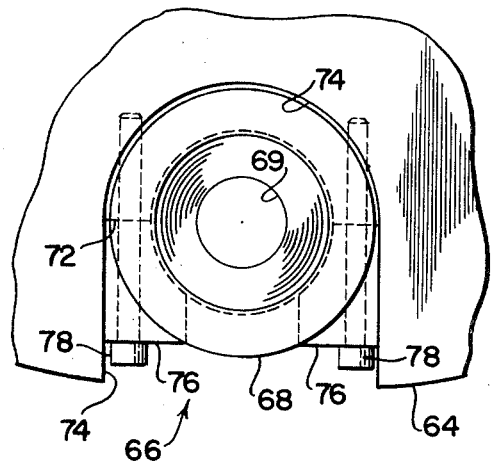
FIG. 5A is a detail plan view of one of the dies shown in FIG. 5.

As previously mentioned, the rotary press C is constructed generally in the manner described in the aforementioned, commonly assigned, patent application. Referring specifically to FIG. 5, the details of the belt guide members and the tooling of the press will be described in detail. As shown, positioned immediately below the belt guide member 60 and arranged for simultaneous rotation therewith is a second disc-like member 64 which carries a plurality of die units 66 at spaced points circumferentially thereof. In the embodiment under consideration, die units 66 each include an extruding ring member 68 which is releasably carried in the disc member 64. As shown in FIG. 5A, each extruding ring 68 has a transversely extending extruding opening 69 which has a diameter corresponding to the desired outer diameter the product of the drawing operation performed in press C. The outer circumference of the die 68 is provided with an inwardly extending recess or groove 70 which mates with an outwardly extending key 72 formed on the wall of a recess 74 which extends inwardly from the outer periphery of member 64. The die 68 is releasably retained in the recess and in engagement with the key 72 by retainer plates 76 which are releasably connected to the member 64 or the key 72 in any convenient manner, such as through the use of screws 78.

As can be seen in FIG. 5, one of the die units 66 is mounted beneath each of the recesses 62 of member 60. Additionally, the dies are located so that when the belt 44 with the blanks 12 therein is in position on member 60, the blanks 12 are axially aligned with the openings 69 of the respective die 68.

Both members 60 and 64 are mounted for simultaneous rotation on the vertically extending support shaft 61. Also, carried by support shaft 61 and mounted for simultaneous rotation with members 60 and 64, are a number of rams 82 equal to the number of die units 66. The rams 82 are reciprocated vertically in a predetermined path by slides 84 driven from a stationary cylindrical drum type cam 86. The slides are provided with the usual cam follower rollers 87 and are guided in their vertical movement by a rotary turret member not shown. The details of constuction of this portion of the press is well known and can be seen, for example, in the aforementioned United States patent application.

Referring to FIGS. 1 and 5, it is seen that as the blanks carried in belt 44 reach the approximate position indicated by the line 1C, the respective punch 82 is spaced above the blank. The cam 86 is arranged so that with continued rotation it drives the punch 82 downwardly, as shown in position 2C into engagement with the blank 12. Continued rotation of the press causes the ram to force the blank from the belt and through the extruding opening 69 of the die 68. As shown in positions 3C and 4C, the blank is forced through the die and the side walls thinned and elongated. Between positions 4C and 5C, the extruded or drawn blank (hereafter identified as 12a) has passed completely through the die 68. Thereafter, the cam 86 actuates the ram 82 upwardly stripping the part 12a therefrom.

It is apparent that with the part 12a stripped from the ram it could simply be allowed to drop into a subjacent hopper or conveyor unit and conveyed in a conventional manner to a subsequent machine, or, alternately batch processed; however, in accordance with an aspect of the subject invention, the finished part is received in an endless flexible belt unit 90 which is formed, for example, generally in the manner described for belt unit 44. That is, the belt unit 90 includes an endless flexible band of stainless steel 92 provided with a plurality of laterally extending, resilient clip members 94. The clip members 94 are, as shown in FIG. 1, provided with openings 96 which have a normal size slightly smaller than the outer diameter of the part 12a which has just been formed by press C.

Means are provided to guide belt 90 adjacent the die unit 66 with the openings in clip members 94 aligned with the respective dies 68 at least during the period of time when the rams 82 are forcing the parts through the die and out its lower end, e.g. position 4C. This provides a receiving and discharging arrangement for the drawn parts 12a. Although these guide means could be positioned externally of the press C and merely operated in timed relationship therewith, they preferably comprise a disc-like member 90 mounted beneath the die carrying disc member 64 and rotatable therewith. Member 98 is formed substantially identically with member 46 and includes recesses 99 which are spaced circumferentially and receive the clips 94 and maintain their openings 91 aligned with the openings 69 of die units 66. Additionally, the belt 90 is supported and guided by pins 93 which extend outwardly from the peripheral surface of member 98 and through openings 95 formed in band 92. In this manner, the means which drive the rotary press C simultaneously drive both the feed and discharge mechanism in perfect timed relationship. Consequently, as part 12C is passed out of the die 68 and stripped from the ram 82 it is immediately gripped and held by the subjacent clip 94.

As can be seen, the use of the endless belt arrangement for feeding the turret press eliminate any type of separately driven reciprocated feed mechanism and the repeated separate handling of the various parts. Additionally, this same type of belt mechanism greatly simplifies the discharge apparatus required for the rotary press. It is important to note that throughout the feeding, working, and discharging steps in the operation of the turret press the part is always firmly gripped by either the belt members or the rams and dies. This allows the mechanisms to function at an extremely high rate when compared with prior feed and discharge mechanisms. Additionally, this arrangement eliminates the need for batch processing between various forming steps in the manufacture of items such as cartridge casings.

ROTARY PRESS D

Referring again to FIG. 1, it is seen that belt 90 is also trained about a second rotary-type forming or drawing press D. Although press D could perform additional operations on the parts coming from machine C, in the embodiment shown, it is utilized to perform an additional drawing, i.e., a redrawing, operation on the blanks. Preferably, press D would be constructed substantially identically with press C other than for modification of the size of the dies.

The belt 90 is shown as passing between presses C and D and being guided about a horizontally positioned guide member or roller 100. Roller 100 is provided with outwardly extending pins 102 which engage the openings 95 formed in band 92. This roller 100 is utilized for maintaining the band under proper tension and, additionally, for adjusting the extent of wrap of the belt 90 on the presses C and D.

Because press D is constructed basically the same as press C further description appears unnecessary. For present purposes it is enough to note that a second belt member 104 formed in the manner of belt members 44 and 90, is trained about press D at a position to receive the parts 12B, i.e. drawn parts 12a. Consequently, belt 104 functions as the discharge belt for press D.

FORMING MACHINE E

An intermediate guide roller 106 is positioned to the left of the press D and assists in guiding the belt 104 about a third press or forming machine E. As shown in FIG. 1, the belt 104, after passing guide roller 106, is guided against the outer circumference 108 of a circular disc member 110 of forming machine E. The belt 104 is maintained in engagement therewith throughout an arcuate extent of approximately 75° and then is led away and about a pair of guide rollers 112 and 114. Rollers 112 and 114 are each provided with inwardly extending recesses 116 and 118 respectively, which engage the clip members on belt 104 and assist in guiding it. After the belt leaves roller 114 it is again brought into engagement with the outer periphery of member 108.

Figure 7:
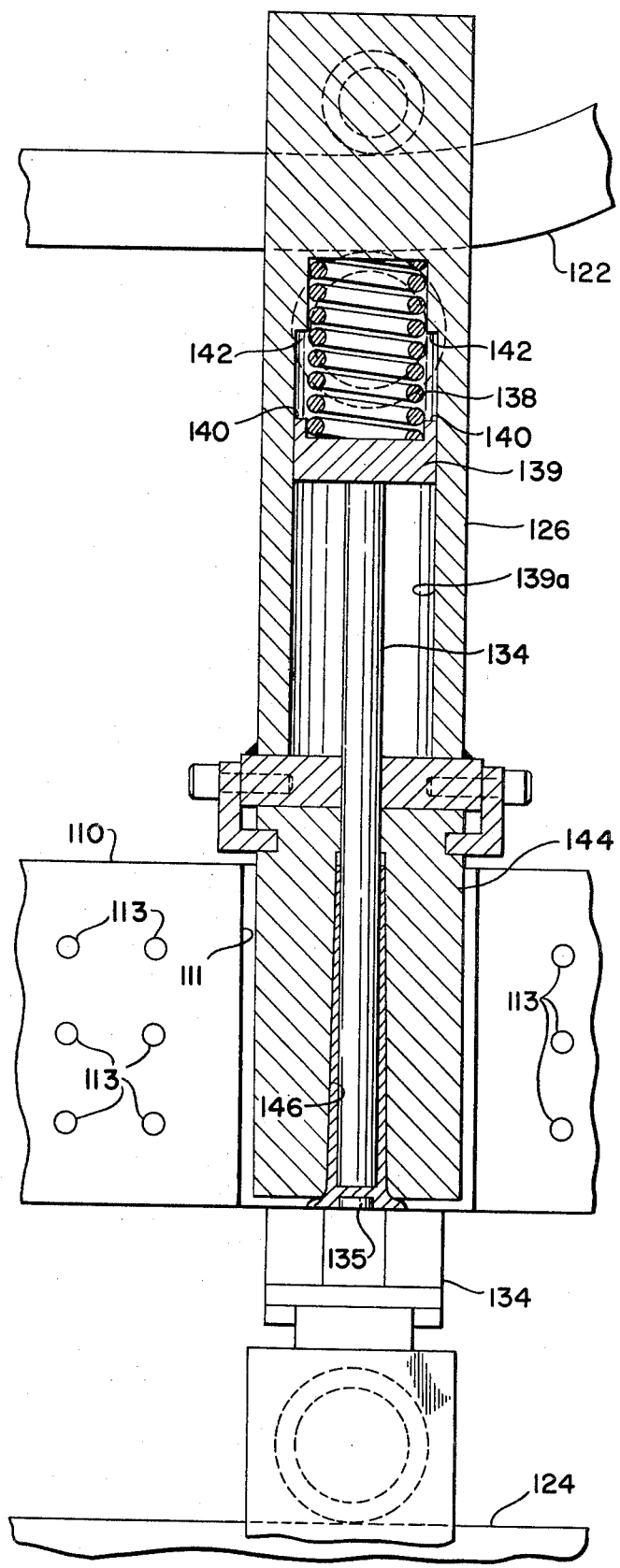

The construction of the forming machine E and the operations taking place therein, can be best understood by reference to FIGS. 6, 6A and 7. As shown in FIGS. 6 and 6A the forming machine E includes a vertically extending support shaft 120 which carries the rotatably mounted disc 110. Continuous, fixed position, drum cam members 122 and 124 are supported by shaft 120 above and below disc 110 respectively. Carried by turret members, not shown, and driven by the cams 122 and 124 respectively, are a plurality of upper slides 126 and lower slides 128. The upper slides 126 each carry a tooling assembly which includes a ram or punch 130 and a tapering mandrel 132. The slides 128 carry a heading die or punch 134 which functions to give the partially formed casing the required head or firing pin end configuration.

The operation of machine E can best be explained by reference to FIGS. 1, 6 and 6A. As shown, the belt 104 coming from press D is received on member 110 and the clips 105 received in the recesses 111. The belt 104 is supported and guided on the outer periphery 108 of member 110 by the combined action of guide rollers 106 and 112 and the outwardly extending pins 113 which engage holes 107 in belt 104 (see FIGS. 6 and 6A). As the clips reach position 1E, the slide 126, under the influence of cam 122, has begun actuating the ram 130 down into the workpiece 12B. During rotation from position 1E to position 2E, the ram 130 continues to enter the casing blank and the respective slide 128 has actuated the heading punch 134 up until the small firing pin opening forming protrusion 135 engages the lower closed end of the blank. At position 2E, the casing is then firmly gripped between the ram 130 and the heading die or punch 134. Because of the position of guide roller 112, the continued rotation of member 110 causes the workpiece to be transversely withdrawn from its position in the resilient clip 105. This withdrawal takes place much in the manner of gear teeth separating.

Referring to FIG. 7, it is seen that the punch or ram 130 is at this time under a downward bias by a spring 138 acting against a piston portion 139 formed on the upper end of ram 134 and guided in a cylinder 139a formed in the slide. As the slide 126 moves from position 2E to position 3E, the punch or ram 130 is moved upwardly in the slide 126 until the shoulders 140 and 142 engage and further upward movement of the ram is prevented. During the final movement of the slide to position 3E, the slide drives the mandrel 144 downwardly about the workpiece 12B. Mandrel 144 is provided with an inwardly extending tapered opening 146 which is arranged to produce the desired slight longitudinal taper to the casing.

Between positions 3E and 4E (FIG. 6A) the heading punch is actuated upwardly a short distance by cam 124. This causes the lower closed end of the workpiece to be headed or formed as shown. At this time the actual forming steps performed in forming machine E are completed and during rotation to position 5E the slide 126 is actuated upwardly and mandrel 144 is withdrawn. Because of the force of spring 138 the punch 130 acts downwardly to strip the tapered workpiece from mandrel 144. At position 5E the formed workpiece is firmly held between the punch 130 and the heading die 134. At this time, as can be seen in FIG. 1, the belt is returned to engagement with the member 110. Accordingly, one of the clips 105 again grips the workpiece by slipping thereover from the side.

As the piece moves from position 5E to position 6E the cams 122 and 124 actuate the punch 130 and the heading die 134 away from the workpiece which is then guided away from the machine along the belt path indicated in FIG. 1.

The belt could, of course, directly convey the headed and tapered workpiece to a discharge machine or, alternately, convey it to an additional forming machine. In the particular layout shown in FIG. 1, the belt 104 is guided between a pair of guide rollers 150 and 152 which are formed generally similar to guide rollers 106 and 112, respectively. After passing around guide roller 152, the belt 104 with the workpieces carried therein, is passed through a conventional induction heating apparatus 156 and 157 which anneals the partially formed cartridge casings. The construction of such induction heating apparatus is well-known and forms no part of the present invention.

After passing through the induction heating apparatus the belt passes about the outer periphery of a discharge apparatus G. Although not shown, discharge apparatus G is constructed in basically the same manner as the inserting apparatus B. The only difference being that the punches or rams of apparatus G are actuated downwardly to an extent sufficient to force the formed parts completely from the belt. Thereafter, the belt 104 is trained about a guide roller 160 and back around forming press D where it again receives the parts being formed in press D.

Although the subject invention has been described with reference to a specific cartridge casing processing line, it is apparent that the same belt type feed and discharge arrangements could be utilized for forming a variety of different parts, such as, can bodies, automatic pencil casings, etc. Additionally, many other types of operations could be performed on the parts while they are in the belts. For example, various gauging, pickling, and washing steps could be carried out with the parts retained in the belt. Further, although the belts have been described as having a preferred construction and configuration it is obvious that other type of belts could be utilized. Further, although the part receiving openings of the belt are shown and described as clips, it is apparent that in many operations, for example in the feed from the inserting apparatus to press C, the part receiving openings could be a simple hole extending transversely through the belt, or a portion thereof.

The invention has been described in great detail sufficient to enable one of ordinary skill in the press art to make and use the same. Obviously, modifications and alterations of the preferred embodiment will occur to others upon a reading and understanding of the specification and it is my intention to include all such modifications and alterations as part of my invention insofar as they come within the scope of the appended claims.

Having thus described my invention, I claim:

1. In a rotary turret press including a rotary turret and a plurality of rams each mounted for reciprocation between first and second positions along separate paths during continuous rotation of said turret,
a respective die member associated with each of said rams and arranged to cooperate therewith to form a workpiece as each said ram moves from said first to said second position, the improvement comprising:
improved means for continuously supplying workpieces between said ram and their respective die members when said rams are in said first position, said means including:
 a first continuous flexible member carrying a plurality of spaced workpiece receiving openings, each said opening being open at its opposite ends and sized so as to resiliently grip workpieces positioned therein; inserting means for inserting workpieces in said openings, and guide means for continuously guiding said member between said rams and their respective dies and successively aligning openings having a workpiece therein with respective ones of said rams and maintaining each said opening aligned with said respective ram at least until said ram engages said workpiece.

2. In combination,
a die;
a ram aligned with said die and reciprocable between a first position spaced from said die to a second position wherein it cooperates with said die to form a workpiece positioned therebetween;
feed means supplying workpieces between said ram and said die when said ram is in first position, said feed means including:
 a first elongated endless flexible member carrying spaced workpiece receiving openings, each said opening being axially open at opposite ends and arranged to resiliently grip a workpiece positioned therein, means for positioning workpieces in said openings, and guide means for guiding said flexible member between said ram and said die and aligning one of said openings with a workpiece therein with said ram and maintaining said one opening aligned therewith at least until said ram engages said workpiece, said die comprising an extruding ring and said ram, when reciprocated from said first to said second position, operable to force a workpiece axially out of said workpiece receiving opening and through said extruding ring.

3. The combination as defined in claim 2 including workpiece receiving and discharging means for receiving workpieces formed through said extruding ring, said workpiece receiving and discharging means including:
a second endless flexible belt carrying spaced workpiece receiving openings,
guide means guiding said belt adjacent said die and bringing one of said openings into workpiece receiving position at least during the time said ram is in said second position and, thereafter, conveying said workpiece away from said die.

4. The improvement as defined in claim 1 wherein said openings are defined by resilient clip members extending laterally from said belt member.

5. The improvement as defined in claim 1 including a second endless flexible belt having spaced workpiece receiving openings and guide means for guiding said belt adjacent said dies for receiving, in said openings, the finished workpieces.

6. In combination:
a turret mounted for continuous rotation about an axis;
a plurality of ram members carried by said turret and spaced radially and circumferentially of said axis;
drive means operable during continuous rotation of said turret for reciprocating each said ram between first and second positions along respective paths parallel to said axis;
an endless flexible member carrying spaced openings adapted to carry material to be acted upon by said rams;
guide means for guiding said flexible member adjacent said turret and bringing said openings successively into alignment with said rams and maintaining each said opening in alignment at least until said respective ram has entered said opening and, each said opening being resilient and adapted to resiliently grip said material.

7. In a rotary turret apparatus including a plurality of rams each mounted for reciprocation between first and second positions along separate paths during continuous rotation of said turret,
improved means for continuously supplying workpieces to positions subjacent between the rams and between said first and second positions when said rams are in said first positions, said means including:
a first continuous flexible belt member carrying a plurality of spaced workpiece receiving openings, each opening being resilient and sized to resiliently grip workpieces inserting means for inserting workpieces in said openings, and guide means for guiding said belt between said rams and their respective second positions and successively aligning openings having a workpiece therein with respective ones of said rams and maintaining each said opening aligned with said respective ram at least until said ram engages said workpiece.

8. A rotary turret press including:
a continuously rotatable turret member;
a plurality of rams carried by said turret member for rotation therewith;
means operative during rotation of said turret for reciprocating said rams between first and second points along parallel paths;
at least one die member aligned with each ram and positioned between said first and second points;
feed means operative during rotation of said turret for supplying workpieces between said rams and said dies when said rams are spaced from said dies; said feed means including a first endless flexible member having resilient workpiece holding members mounted thereon at spaced points, each holding member having a resilient workpiece holding opening extending completely therethrough and sized to resiliently grip a workpiece;
a workpiece discharge means for discharging finished workpieces from said press, said discharge means including a second endless flexible member carrying workpiece receiving members each being resilient and having a workpiece receiving opening extending therethrough and sized to resiliently hold a finished workpiece;
and, guide means for guiding said first and second endless flexible members adjacent said turret member for rotation therewith, said guide means arranged to align and position said workpiece holding openings between said first position and said dies and said workpiece receiving openings between said second point and said dies whereby as said turret rotates and said rams are moved from said first to said second points, workpieces in said workpiece holding openings are moved out of said holding openings through said dies and into said receiving openings.

9. The improvement as defined in claim 1 wherein said openings are laterally open whereby workpieces can be removed laterally from said openings.

10. In combination,
a die;
a ram aligned with said die and reciprocable between a first position spaced from said die to a second position wherein it cooperates with said die to form a workpiece positioned therebetween;

feed means supplying workpieces between said ram and said die when said ram is in first position, said feed means including:

a first elongated endless flexible member carrying spaced workpiece receiving openings, each said opening being axially open at opposite ends and arranged to resiliently grip a workpiece positioned therein, means for positioning workpieces in said openings, and guide means for guiding said flexible member between said ram and said die and aligning one of said openings with a workpiece therein with said ram and maintaining said one opening aligned therewith at least until said ram engages said workpiece.

11. The combination as defined in claim 10 wherein said feed means are driven in timed relationship with said ram and said resilient openings permit said workpieces to move axially therein when said ram engages said workpieces.

References Cited

UNITED STATES PATENTS

| | | | |
|---|---|---|---|
| 1,117,097 | 11/1914 | Sherman | 72—349 |
| 2,403,286 | 7/1946 | Johnson | 29—33.12 |
| 2,347,102 | 4/1944 | Hartmann | 72—346 |
| 3,439,520 | 4/1969 | Schwartz | 72—405 |

RICHARD J. HERBST, Primary Examiner

U.S. Cl. X.R.

29—563; 72—405, 421